Figure 1:
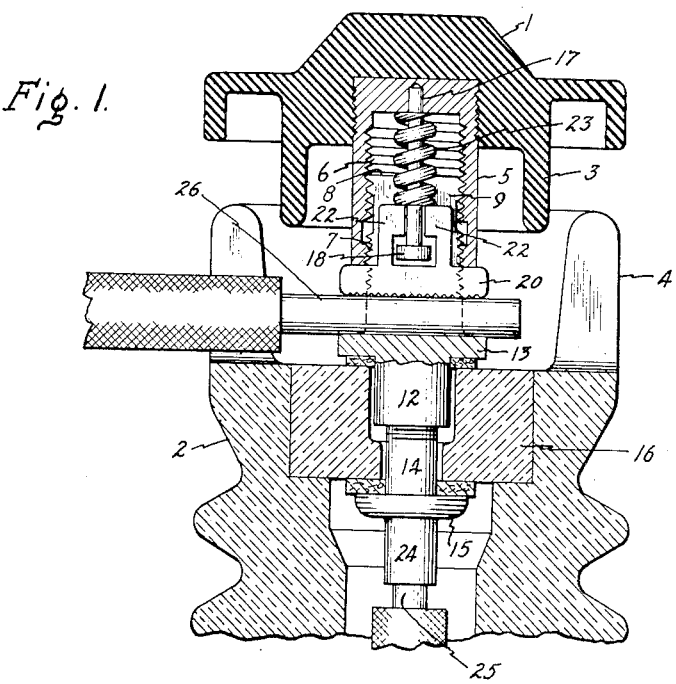

March 27, 1956  M. BROVERMAN  2,740,100
ELECTRICAL CABLE CLAMP
Filed Aug. 24, 1953

Inventor
Michael Broverman,
by Gilbert P. Tarleton
His Attorney.

United States Patent Office 2,740,100
Patented Mar. 27, 1956

2,740,100

ELECTRICAL CABLE CLAMP

Michael Broverman, Pittsfield, Mass., assignor to General Electric Company, a corporation of New York Application August 24, 1953, Serial No. 376,196

3 Claims. (Cl. 339—202)

This invention relates to an electrical cable clamp, and more particularly, to a cable clamp adapted to clamp electrical conductors constructed out of aluminum or other ductile materials.

Recently the electrical industry has experienced a wider use of electrical cables constructed out of aluminum. Cables constructed out of aluminum or other ductile materials pose special problems. Aluminum, for instance, when clamped to a terminal works loose. The forces used to connect the cable to the terminal deform the aluminum whereby the cable is no longer securely fastened to the terminal. One answer to this problem has been to construct a clamp with a spring follow-up mechanism. Conventionally a spring in the follow-up mechanism continuously urges one of the contact members of the clamp against the cable. Accordingly, if the cable experiences any deformation or cold flow the spring will cause the cable to be clamped. In any cable clamp with a spring follow-up mechanism it is preferable to provide means whereby a workman cannot exert too much clamping force on the clamping members thereby compressing the spring to such a great extent as to destroy it. Also, in the construction of any cable clamp it is desirable to provide means whereby the workman cannot completely disassociate the nut member from the stud member of the clamp. Sometimes the workman is working with only one hand and it is therefore very useful to so construct the cable clamp that he may insert the cable into the clamp with one hand and then tighten the clamp with one hand without any danger of the clamp parts becoming disassembled or entirely disconnected. It is further desirable in any cable clamp to completely enclose the cable clamp whereby no live metallic parts will be exposed to the weather or to endanger the life of the workman operating the clamp.

Accordingly, it is an object of this invention to provide a cable clamp which is completely enclosed within a pair of insulating members whereby no metallic parts are exposed thereby protecting the workman and protecting the metallic parts of the clamp from deterioration.

It is a further object of this invention to provide a cable clamp having a novel spring follow-up mechanism whereby when a ductile conductor is clamped in the clamp if cold flow occurs the spring follow-up mechanism will insure that the cable is securely clamped.

It is a further object to this invention to provide a cable clamp having a spring follow-up mechanism whereby means are provided to insure that the spring of the spring follow-up mechanism cannot be stressed beyond a predetermined value.

It is a further object of this invention to provide a cable clamp having a nut member and a stud member with provision for spin free threadless engagement therebetween whereby the nut member can be unthreaded with respect to the stud member to facilitate removal or clamping of a cable without danger of the nut member and stud member becoming completely disassembled.

My invention comprises a cable clamp enclosed in two cup-shaped telescopic insulating material members, one of said members having a cylindrical nut member fixed therein, the other of said cup-shaped members having a stud fixed therein, the interior of said cylindrical nut member having two spaced threaded sections engageable with two spaced threaded sections on said stud whereby said nut member threaded sections can be unthreaded with respect to said stud threaded sections for spin free threadless engagement of said nut member with respect to said stud without entirely disconnecting said nut member from said stud, a pin within said nut member, said pin carrying a T-shaped contact member, a lost motion connection between said T-shaped contact member and said pin and a spring surrounding said pin and urging said T-shaped contact member outwardly of said nut member, said stud having an axial slot therethrough, said slot extending from one end of said stud towards another end of said stud and extending through opposite sides of said stud, said stud disposed within said nut member and said pin, spring, and T-shaped contact member disposed within said slot, the cross piece of said T-shaped contact member having its opposite ends extending laterally beyond the outer surface of said nut member whereby when a cable is clamped between said T-shaped contact member and said stud another end said spring will not be compressed beyond a predetermined value.

The invention will be better understood by considering the following description taken in connection with the accompanying drawing and its scope will be pointed out in the appended claims.

Figure 2:
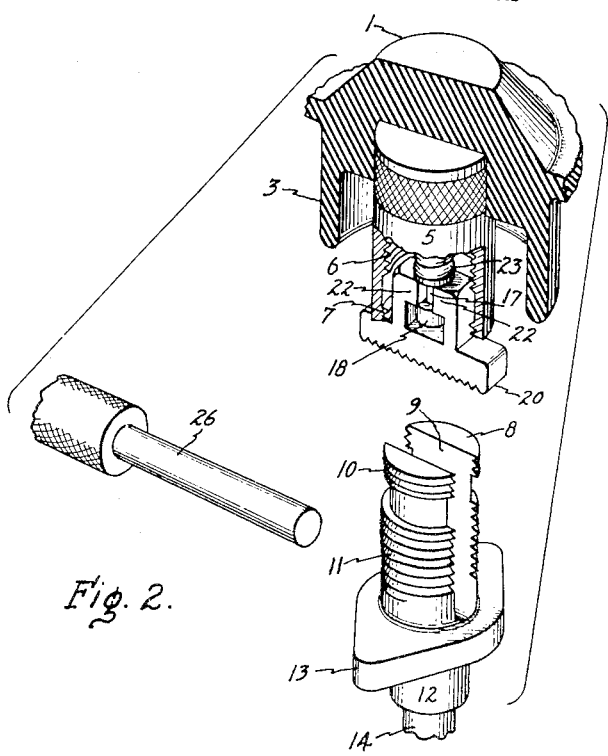

In the drawing, Fig. 1 represents a side view of my invention, certain parts being in section to better illustrate my device. Fig. 2 represents a perspective view of my invention, certain parts thereof being disassembled to better illustrate my cable clamp.

Referring now to the drawing, shown therein is a cable clamp comprising two cup-shaped insulating material members 1 and 2. Cup-shaped members 1 and 2 are adapted for telescopic interfitting whereby the metallic parts of my clamp will be completely enclosed within the insulating material members to protect said metallic parts from deterioration and protect a workman from contact with said metallic parts. Cup-shaped member 1 has an integral cylindrical flange 3 thereon and cup-shaped member 2 has an integral cylindrical flange 4. The outer diameter of the cylindrical flange 3 is slightly less than the inner diameter of the cylindrical flange 4 whereby the two flanges will interfit in telescopic relationship to completely enclose the metallic parts of my cable clamp.

The cup-shaped member 1, which is the knob member of my clamping device, carries a cylindrical nut 5. The upper end of the nut 5 is closed and the lower end of the nut 5 is open. The interior cylindrical surface of nut member 5 has two threaded sections 6 and 7 thereon, said threaded sections 6 and 7 being spaced by a threadless portion for a purpose which will be clear hereinafter.

Cooperative with the nut member 5 is a stud member 8. As seen more clearly from Fig. 2 stud member 8 has a slot 9 extending axially from one end thereof towards another end thereof. The slot 9 also extends through opposite sides of said stud member 8. On the exterior surface of stud member 8 are provided two spaced threaded sections 10 and 11. The threaded section 10 extends for a distance less than the threadless space between threaded sections 6 and 7, and the threaded section 7 on the nut member 5 extends for a distance less than the threadless space between the threaded sections 10 and 11. Accordingly, when the nut member 5 is partially unthreaded with respect to the stud member 8 a spin free threadless interaction between the nut member 5 and the stud member 8 is provided. When the threaded section 10 of stud 8 is opposite to the threadless space between the threaded sections 6 and 7 the nut member 5 is spin free with respect to the stud member 8. In this position of the nut member 5 with respect to the stud member 8 the cable clamp is open whereupon a cable to be clamped or unclamped can be readily inserted or removed from the clamp without complete removal of the knob 1 and nut member 5 with respect to the stud 8 and other insulating material cup-shaped member 2.

The nut member 5 is rigidly carried by the knob 1 as by knurling the upper closed end of the nut member 5. The stud member 8 is rigdly connected to the cup-shaped member 2. As seen in the drawing the stud member 8 has a socket portion 12 at the lower end thereof. Between said socket 12 and the threaded sections of the stud member 8 is a clamping plate 13. Socket 12 is adapted to receive a connector 14. The connector 14 has a shoulder 15 thereon whereby the stud member 8 is connected to the cup-shaped member 2 by clamping an insulating material disk 16 between the clamping plate 13 and shoulder 15. Disk 16 is integrally connected to cup-shaped member 2 and suitable gaskets are interposed between the clamping plate 13, shoulder 15 and disk 16 to make the axial opening through the disk 16 for the socket 12 and connector 14 liquid tight.

Coincidental with the axis of nut 5 is a pin 17. The upper end of pin 17 is fastened to the upper closed end of nut 5. The lower end of pin 17 extends adjacent to the lower open end of nut 5 but short thereof. The lower end of pin 17 has a knob or shoulder 18 thereon. Cooperative with the pin 17 is a generally T-shaped contact member. The cross piece 20 of said T-shaped contact member is disposed adjacent to the lower open end of nut 5. The upstanding leg portion of the T-shaped contact member comprises two spaced L-shaped portions. One end of a leg of each of said L-shaped portions is connected to the cross piece 20 between the opposite ends of the cross piece 20. The other legs or tabs 22 of said L-shaped portions extend towards each other on opposite sides of pin member 17. The knob 18 has a lateral dimension or width greater than the space between the oppositively disposed tabs 22 whereby the tabs 22 will catch on the knob or shoulder 18 to prohibit the T-shaped contact member from becoming completely disassembled with respect to the nut member 5. The depth of the knob or shoulder 18 is less than the distance between the opposed tabs 22 and the cross piece 20. Accordingly, a lost motion connection is provided between the T-shaped contact and the pin member 17. A spring 23 surrounds the pin 17 and abuts at one end the closed upper end of nut 5 and at its other end the tabs or other legs 22 of the L-shaped portions. Said spring 23 continuously urges the T-shaped contact member away from the lower open end of the nut 5 whereby a clamping force is continuously imposed upon a conductor clamped in the clamp even though said conductor should become deformed and tend to work losse.

As seen in Fig. 1, the stud member 8 is disposed within the nut member 5 and is threadably engaged with nut 5. The pin 17, spring 23, and the T-shaped contact member are disposed within the slot 9 of the stud member 8. An insulated electrical conductor 25 is connected to a socket portion 24 of connecting member 14. An insulated cable 26 is clamped between the cross piece 20 of the T-shaped contact member and the clamping plate 13. If so desired, the lower surface of cross piece 20 can be appropriately corrugated or have teeth formed therein to bite into the cable 26.

In the Fig. 1 position of my device the opposite end portions of the cross piece 20 are shown as abutting the lower open end of the nut 5. The cable clamp is shown in its fully clamped position. With the opposite ends of cross piece 20 abutting the lower edges of the nut 5 provision is made to insure against tightening spring 23 to such an extent as to rupture or destroy it. When the cable 26 becomes deformed or experiences cold flow it will tend to work loose. However, the spring 23 exerts a downward force on the T-shaped contact member to insure that cable 26 is always securely clamped. That is, after the cable clamp is in its fully clamped position the cross piece 20 can move downward with respect to the clamping plate 13 for a distance corresponding to the space between the upper surface of the knob 18 and the lower surfaces of the tabs 22 to take up the slack in the clamp due to deformation of cable 26.

Also, as seen in Fig. 1 wherein the cable clamp is in its fully tightened position, the cylindrical flanges 3 and 4 are in telescopic relationship whereby the metallic parts of the clamp are completely enclosed within the two insulating material members 1 and 2. The flange 4 has two grooves formed in opposite sides thereof aligned with the slot 9 whereby the cable 26 can be inserted through either of said grooves in flange 4 into the slot 9 between the cross piece 20 and the clamping plate 13 without interference by said telescopic relationship.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. A clamp comprising a cylindrical nut closed at one end thereof and open at the other end thereof, the interior surface of said nut having two spaced threaded sections, and a stud having a threaded exterior section thereon whereby said nut and stud can be threadably engaged with respect to each other, said stud threaded section extending for a distance less than the distance between said nut two spaced threaded sections whereby said nut can be threadably disengaged from said stud for spin free threadless engagement therewith without completely disengaging said nut from said stud, a pin concentric with the axis of said nut fastened at one end thereof to said nut closed end and extending therefrom towards another end of said pin, said pin another end terminating short of said nut open end, said pin another end having a knob-like shoulder thereon, a contact member having a cross piece extending normal to said pin and axis and disposed outside of said nut adjacent said nut open end, said cross piece extending beyond opposite sides of said nut and adapted to abut said nut open end, two spaced leg portions connected at one end thereof to said cross piece between opposite ends of said cross piece, said leg portions extending from said cross piece into said nut adjacent opposite sides of said pin, the ends of said leg portions opposite to said leg portions one end having tabs formed thereon directed towards each other whereby said tabs will catch on said shoulder to retain said contact member on said pin, said shoulder having a depth less than the distance between said tabs and said cross piece to provide a lost motion connection between said contact member and said pin, a spring surrounding said pin and abutting said nut closed end and said tabs to urge said cross piece away from said nut open end, said stud having an axial slot extending from one end thereof towards another end thereof and extending through opposite sides of said stud, said stud disposed within said nut and said spring, pin, and contact member disposed within said slot whereby a cable is adapted to be clamped between said cross piece and said stud another end.

2. A cable clamp comprising a nut adapted for threaded engagement with a stud, said nut being closed at one end thereof, a pin centrally disposed within said nut connected to said closed end, said pin extending towards another open end of said nut but short thereof, an end of said pin adjacent said open end having a knob-like shoulder thereon, said shoulder disposed slightly inward of said open end, a contact member having a cross piece, said cross piece disposed normal to said pin and positioned adjacent said open end, opposite ends of said cross piece extending laterally beyond opposite sides of said nut, two spaced leg portions normal to said cross piece between said opposite ends extending into said nut along opposite sides of said pin, innermost ends of said leg portions having tabs formed thereon extending towards each other whereby said tabs will catch on said shoulder, said shoulder having a depth less than the distance between said tabs and cross piece whereby a lost motion connection is provided between said cross piece and said open end, a spring surrounding said pin and continuously urging said cross piece away from said open end, said stud having a clamping plate at one end thereof, an axial slot extending from another end of said stud to said clamping plate, said slot extending through opposite sides of said stud, said stud disposed within said nut and said cross piece disposed within said slot whereby an electrical conductor is adapted to be clamped between said cross piece and said clamping plate within said slot.

3. A clamp having a nut which is closed at one end thereof and open at the other end thereof, said nut being threadably engaged with a split stud, a contact disposed in the slot of said split stud adjacent said nut open end, said contact extending across said slot whereby opposite end portions of said contact are disposed for abutting engagement with said nut open end, a spring disposed within said nut for urging said contact away from said nut open end, and a lost motion connection between said nut and contact whereby when said clamp is fully tightened said contact opposite end portions will abut said nut open end to ensure transmittal of substantially all of the clamping thrust on said contact directly to said nut and to ensure against overcompression of said spring.

References Cited in the file of this patent

UNITED STATES PATENTS

| | | |
|---|---|---|
| 1,810,901 | Bormann | June 23, 1931 |
| 2,672,595 | Barr | Mar. 16, 1954 |

FOREIGN PATENTS

| | | |
|---|---|---|
| 529,349 | Great Britain | Nov. 19, 1940 |